United States Patent
Yamashita et al.

(10) Patent No.: US 12,424,894 B2
(45) Date of Patent: Sep. 23, 2025

(54) PHASE RING SUPPORT STRUCTURE AND ROTATING ELECTRIC MACHINE

(71) Applicant: MITSUBISHI GENERATOR CO., LTD., Kobe (JP)

(72) Inventors: Wataru Yamashita, Tokyo (JP); Tatsuya Okuda, Tokyo (JP)

(73) Assignee: MITSUBISHI GENERATOR CO., LTD., Kobe (JP)

( * ) Notice: Subject to any disclaimer, the term of this patent is extended or adjusted under 35 U.S.C. 154(b) by 147 days.

(21) Appl. No.: 18/547,734

(22) PCT Filed: May 14, 2021

(86) PCT No.: PCT/JP2021/018341
§ 371 (c)(1),
(2) Date: Aug. 24, 2023

(87) PCT Pub. No.: WO2022/239219
PCT Pub. Date: Nov. 17, 2022

(65) Prior Publication Data
US 2024/0136881 A1  Apr. 25, 2024
US 2024/0235312 A9  Jul. 11, 2024

(51) Int. Cl.
H02K 3/50 (2006.01)
H02K 3/34 (2006.01)

(52) U.S. Cl.
CPC .............. H02K 3/50 (2013.01); H02K 3/34 (2013.01); *H02K 2203/09* (2013.01)

(58) Field of Classification Search
CPC ......... H02K 3/34; H02K 3/50; H02K 2203/09
(Continued)

(56) References Cited

U.S. PATENT DOCUMENTS

| | | | | |
|---|---|---|---|---|
| 4,587,723 A | * | 5/1986 | Scuro | H01R 43/12 29/826 |
| 2007/0252444 A1 | * | 11/2007 | Sadakane | H02K 41/031 310/12.21 |
| 2024/0136881 A1 | * | 4/2024 | Yamashita | H02K 3/50 |

FOREIGN PATENT DOCUMENTS

| | | |
|---|---|---|
| JP | S6117846 U | 2/1986 |
| JP | S61144752 U | 9/1986 |

(Continued)

OTHER PUBLICATIONS

International Search Report (PCT/ISA/210) with translation and Written Opinion (PCT/ISA/237) mailed on Jul. 6, 2021, by the Japan Patent Office as the International Searching Authority for International Application No. PCT/JP2021/018341. (10 pages).

(Continued)

*Primary Examiner* — Rashad H Johnson
(74) *Attorney, Agent, or Firm* — BUCHANAN, INGERSOLL & ROONEY PC

(57) ABSTRACT

A metal support structural body is provided on the radially outer side of a phase ring for connecting a rotating electric machine armature winding at a stator end. An insulator ensuring an insulation distance to the ground is interposed between the phase ring and the metal support structural body. Thus, long-term reliability improves as compared to a conventional insulation-to-ground structure. Since the insulation distance to the ground is ensured by the insulator, the phase ring and the metal support structural body are configured with an insulation thickness smaller than needed for insulation to the ground, thereby improving cooling performance for the phase ring and the metal support structural body. Occurrence of induced current in the metal support structural body is suppressed, thus allowing application of a simple fastening structure such as metal bolts to a stator frame.

8 Claims, 3 Drawing Sheets

(58) Field of Classification Search
USPC ............................................................ 310/71
See application file for complete search history.

(56) References Cited

FOREIGN PATENT DOCUMENTS

| | | | |
|---|---|---|---|
| JP | H036078 | A | 1/1991 |
| JP | H04340344 | A | 11/1992 |
| JP | 2002010559 | A | 1/2002 |
| JP | 2003250234 | A | 9/2003 |

OTHER PUBLICATIONS

Notice of Reasons for Refusal dated Jul. 16, 2024, issued in the corresponding Japanese Patent Application No. 2023-520710, 6 pages including 3 pages of English Translation.

* cited by examiner

PHASE RING SUPPORT STRUCTURE AND ROTATING ELECTRIC MACHINE

TECHNICAL FIELD

The present disclosure relates to a phase ring support structure and a rotating electric machine.

BACKGROUND ART

As a phase ring support structure, there is known a structure in which a phase ring having a conductor connecting stator coil ends in different phase bands or connecting a stator coil end and a rotating electric machine terminal, and an insulation-to-ground layer around the conductor, is fixed to a phase ring support by a binding string (see, for example, Patent Document 1). In order to keep the phase ring firmly fixed even when the binding string is loosened through long-time operation, a disc spring is provided between the phase ring and the phase ring support, and they are fastened by the binding string.

CITATION LIST

Patent Document

Patent Document 1: Japanese Laid-Open Patent Publication No. 2002-10559

SUMMARY OF THE INVENTION

Problem to be Solved by the Invention

However, since the disc spring in Patent Document 1 is made of metal, discharge occurs between the phase ring and the phase ring support, and due to aging deterioration or overvoltage, insulation between the phase ring and the phase ring support might break down.

Patent Document 1 also discloses a structure in which the disc spring is interposed between insulation plates. However, since the disc spring is made of metal, when discharge occurs between the phase ring and the phase ring support, the discharge detours around the insulation plates to reach the phase ring and the phase ring support, so that insulation might break down.

In addition, difficulty inevitably increases in insulation designing for an armature winding stator end in a rotating electric machine having a complicated structure due to high-voltage application, or in vibration designing for the phase ring for making wire connection at an armature winding stator end in a rotating electric machine due to increase in electromagnetic excitation force based on large-current application.

That is, as the phase ring support structure in vibration designing for the phase ring, a metal support structural body may be adopted in view of ensuring support rigidity, and insulation to the ground may be provided for the phase ring and the metal support structural body. However, there are problems such as temperature increase in the phase ring and the metal support structural body, inefficient assembly work for the metal support structural body, and low support rigidity at a fixation part of the metal support structural body.

In particular, temperature increase in the phase ring and the metal support structural body is caused by poor heat dissipation due to increase in thermal resistance when the insulation thickness provided for insulation to the ground increases due to high-voltage application.

In addition, the metal support structural body may be placed on the radially inner side of the phase ring. In this structure, the phase ring physically penetrates the inside of an electric closed circuit formed by the metal support structural body and a stator frame, and occurrence of induced current in the closed circuit is inevitable. As a result, the metal support structural body causes great electric loss and can be more disadvantageous in terms of temperature increase. In order to suppress the induced current, the closed circuit needs to be interrupted. Therefore, for example, an insulation plate is interposed between the metal support structural body and the stator frame, and components such as an insulation tube, an insulation washer, and a disc spring as a measure for insulator creeping need to be provided around a metal bolt serving for fastening. Thus, the number of components in assembling increases, resulting in deterioration in assembly workability.

Further, in the case where the metal support structural body is placed on the radially inner side of the phase ring, the metal support structural body needs to be placed among closely arranged structural members such as a stator coil, a series connection plate, and the phase ring which are components at the armature winding stator end. Therefore, it is difficult to ensure a working space for attaching/detaching the metal support structural body, and in addition, because of the limited space, there are dimension surface constraints, so that the shape of the metal support structural body end is complicated and it is difficult to ensure predetermined support rigidity.

The present disclosure has been made to solve the above problems, and an object of the present disclosure is to provide a phase ring support structure for a rotating electric machine with which cooling performance is improved, a working period is shortened, and the number of components is decreased.

Means to Solve the Problem

A phase ring support structure according to the present disclosure is for supporting a phase ring for making, at a stator end, wire connection of an armature winding of a rotating electric machine, and includes: a support structural body made of a metal material and provided on a radially outer side of the phase ring; an insulator provided between the support structural body and the phase ring and formed so as to ensure an insulation distance to a ground; and a fixation member fixing the phase ring, the support structural body, and the insulator integrally.

Effect of the Invention

In the phase ring support structure according to the present disclosure, the insulator is interposed between the phase ring and the support structural body, whereby a necessary insulation distance can be ensured. Thus, the phase ring and the support structural body can be configured with an insulation thickness smaller than needed for insulation to the ground, whereby cooling performance can be improved, a working period can be shortened, and the number of components can be decreased.

DESCRIPTION OF EMBODIMENTS

Figure 1:
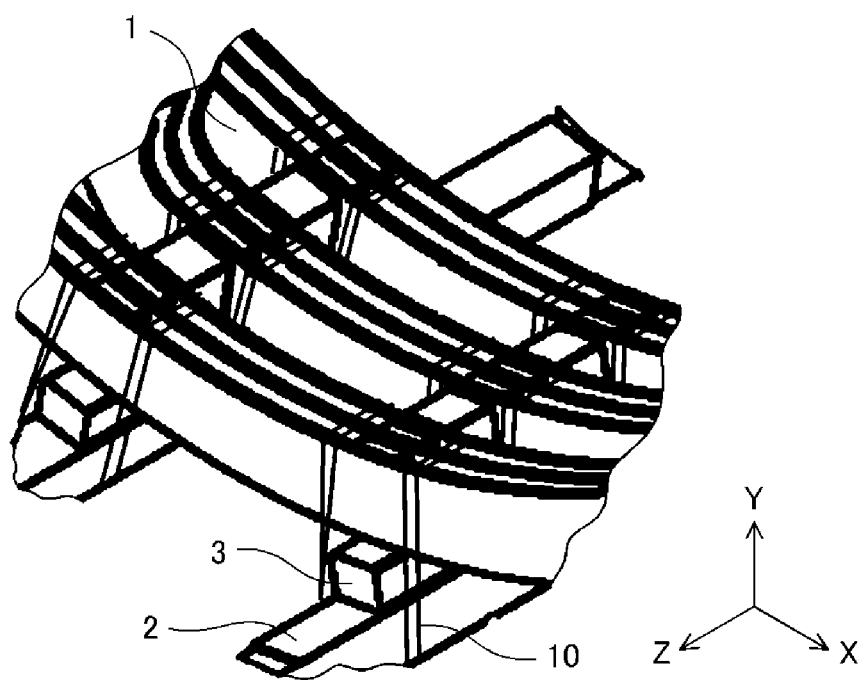
FIG. 1 is a perspective view of a phase ring support structure according to embodiment 1.

Hereinafter, preferred embodiments of a phase ring support structure according to the present disclosure will be described with reference to the drawings. The same or corresponding matters and parts are denoted by the same reference characters, and the detailed description thereof is omitted.

Embodiment 1

Figure 2:
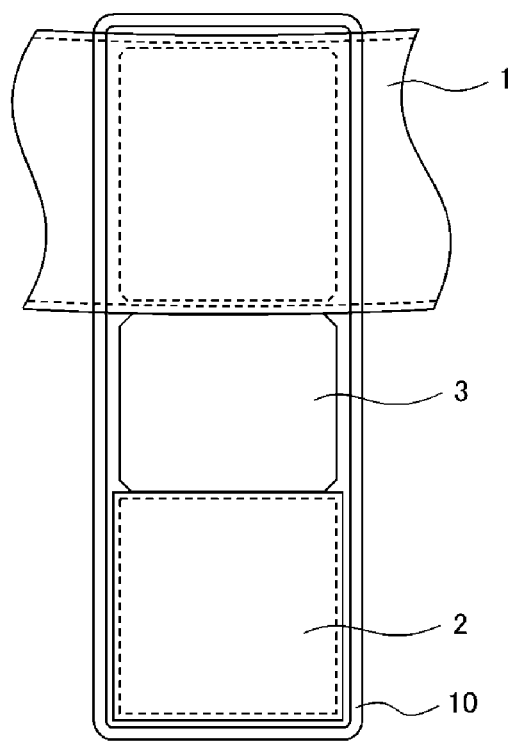
FIG. 2 is a sectional view along a radial direction in FIG. 1.
Figure 3:
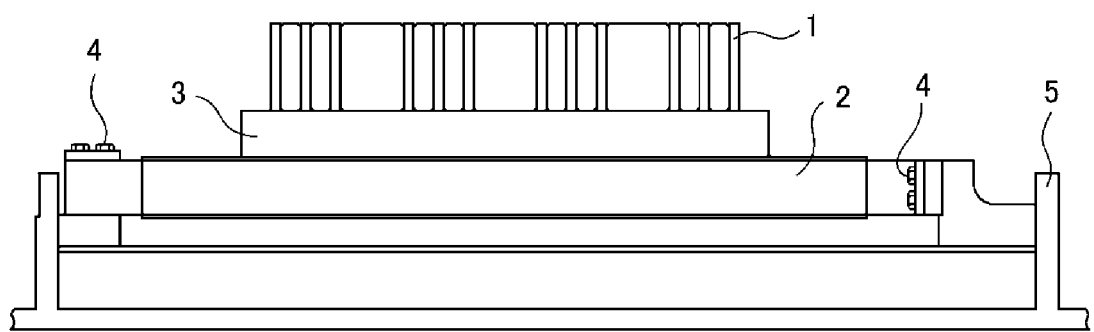
FIG. 3 is a sectional view along an axial direction in FIG. 1.

FIG. 1 is a perspective view of a phase ring support structure according to embodiment 1, FIG. 2 is a sectional view along a radial (Y) direction of a phase ring 1 in FIG. 1, and FIG. 3 is a sectional view along an axial (Z) direction of the phase ring 1 in FIG. 1.

In FIG. 1 and FIG. 2, the phase ring support structure is provided at a stator winding end in a rotating electric machine and is composed of the phase ring 1, a metal support structural body 2, and an insulator 3. The phase ring 1 is for making, at a stator end, wire connection of an armature winding of the rotating electric machine. The metal support structural body 2 made of a metal material is provided on the radially outer side of the phase ring 1. The phase ring 1 is fixed by a fixation member such as a binding string 10 with the insulator 3 interposed between the phase ring 1 and the metal support structural body 2. The insulator 3 has such dimensions that can ensure an insulation distance to the ground.

In FIG. 3, both ends of the metal support structural body 2 provided on the radially outer side of the phase ring 1 are fixed to a stator frame 5 by being fastened by metal bolts 4. The fixation method is not limited to fastening by the metal bolts 4, and may be welding.

With this structure, such a distance that discharge does not occur can be ensured by the insulator 3. Thus, the insulation thickness between the phase ring 1 and the metal support structural body 2 can be made smaller than that for insulation to the ground, and the number of turns of an insulation tape wound around the phase ring 1 and the metal support structural body 2 can be decreased. Since the insulation thickness is reduced, cooling performance for the phase ring 1 and the metal support structural body 2 is improved. Further, since the number of taping turns is decreased, a working period can be shortened.

In addition, the structure in which a necessary insulation distance to the ground is ensured by interposing the insulator 3 between the phase ring 1 and the metal support structural body 2, improves long-term reliability of insulation as compared to a conventional insulation-to-ground structure.

In addition, since the metal support structural body 2 is provided on the radially outer side of the phase ring 1, the phase ring 1 can pass outside an electric closed circuit formed by the metal support structural body 2 and the stator frame 5. Thus, electric loss in the metal support structural body 2 caused by induced current can be minimized, and interruption of the closed circuit is not needed. As a result, it is not necessary to incorporate a structure having electric insulation property using a plurality of components, and it becomes possible to perform simple fastening using a member such as a metal bolt not having electric insulation property, so that an assembly working period can be shortened.

In addition, since the metal support structural body 2 is provided on the radially outer side of the phase ring 1, it becomes possible to ensure an assembly working space at the armature winding stator end and a space for a structure at an end of the metal support structural body 2. Thus, assembly workability in attaching/detaching of the metal support structural body 2 can be improved, and translation and rotation of the end structure of the metal support structural body 2 can be completely constrained, whereby deflection rigidity corresponding to a simple support beam fixed at both ends can be obtained.

Embodiment 2

Figure 4:
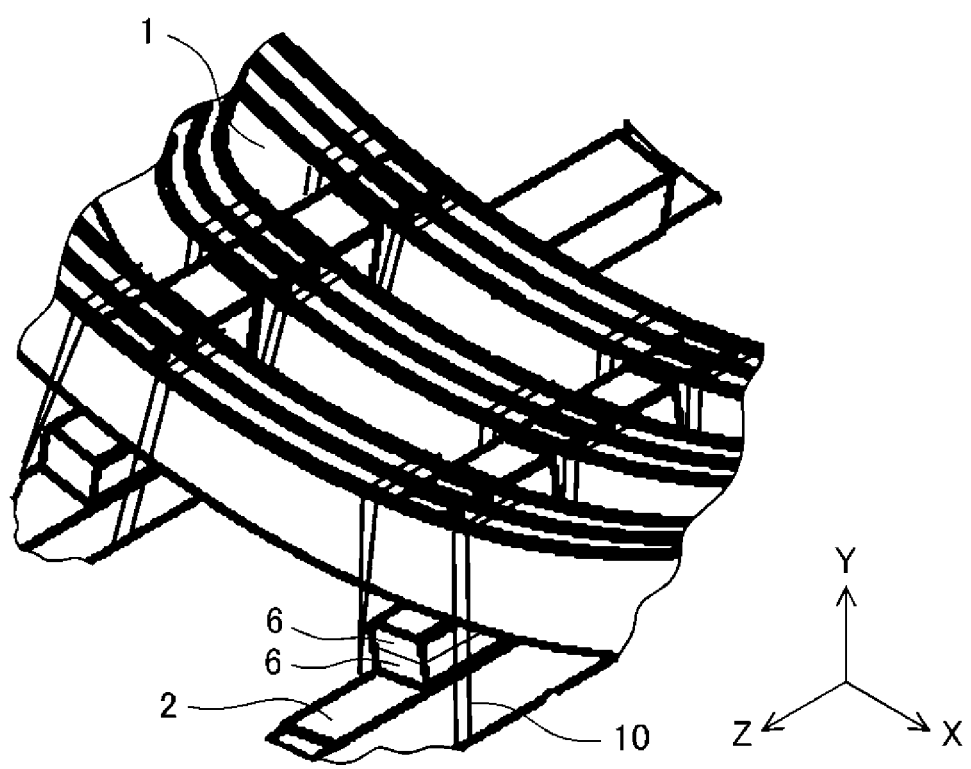
FIG. 4 is a perspective view of a phase ring support structure according to embodiment 2.
Figure 5:
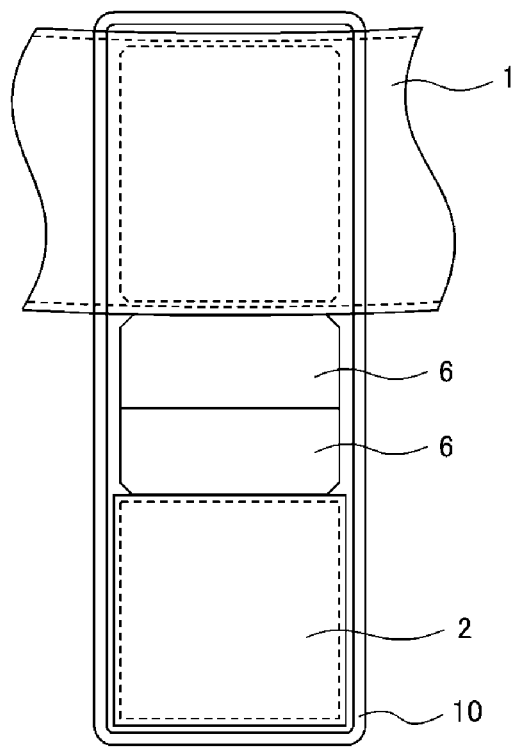
FIG. 5 is a sectional view along the radial direction in FIG. 4.
Figure 6:
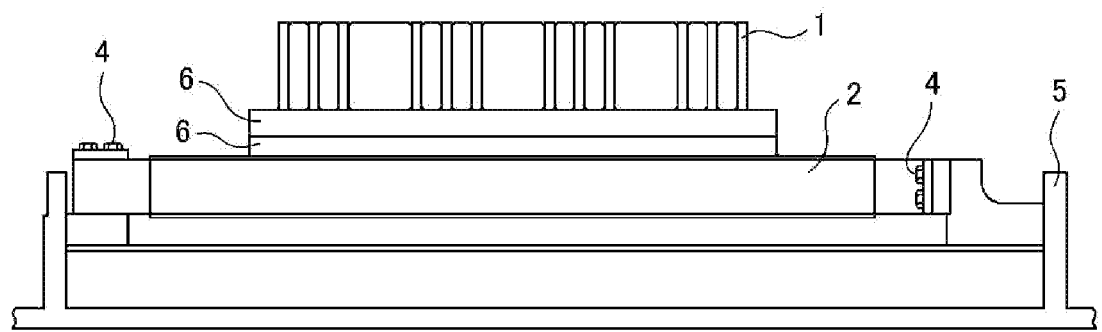
FIG. 6 is a sectional view along the axial direction in FIG. 4.

FIG. 4 is a perspective view showing a phase ring support structure according to embodiment 2, FIG. 5 is a sectional view along the radial (Y) direction in FIG. 4, and FIG. 6 is a sectional view along the axial (Z) direction in FIG. 4. Except for insulators 6 having a stacked structure including a plurality of insulators, the configurations are the same as in embodiment 1 and therefore the description thereof is omitted.

The insulators 6 are fixed by the binding string 10, in a state of being interposed between the phase ring 1 and the metal support structural body 2, as with the insulator 3 described in embodiment 1. The insulators 6 are formed in such sizes that can ensure an insulation distance to the ground, by a stacked structure including a plurality of insulators.

With this configuration, the effects described in embodiment 1 are provided, and in addition, at the time of winding, the interval between the phase ring 1 and the metal support structural body 2 can be easily adjusted, whereby assembly workability can be improved.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 phase ring
2 metal support structural body
3, 6 insulator
4 metal bolt
5 stator frame
10 binding string

The invention claimed is:

1. A phase ring support structure for a phase ring for making, at a stator end, wire connection of an armature winding of a rotating electric machine, the phase ring support structure comprising:
   a support structural body made of a metal material and provided on a radially outer side of the phase ring;
   an insulator provided between the support structural body and the phase ring and formed so as to ensure an insulation distance to a ground; and
   a fixation member fixing the phase ring, the support structural body, and the insulator integrally.

2. The phase ring support structure according to claim 1, wherein
   the support structural body is fixed to a stator frame by a fastening structure not having electric insulation property.

3. The phase ring support structure according to claim 2, wherein
   the insulator has a stacked structure including a plurality of insulators.

4. A rotating electric machine comprising the phase ring support structure according to claim 3.

5. A rotating electric machine comprising the phase ring support structure according to claim 2.

6. The phase ring support structure according to claim 1, wherein
   the insulator has a stacked structure including a plurality of insulators.

7. A rotating electric machine comprising the phase ring support structure according to claim 6.

8. A rotating electric machine comprising the phase ring support structure according to claim 1.

* * * * *